United States Patent
Kim et al.

(10) Patent No.: US 10,244,305 B2
(45) Date of Patent: Mar. 26, 2019

(54) PORTABLE SOUND DEVICE

(71) Applicant: LG ELECTRONICS INC., Seoul (KR)

(72) Inventors: Donghan Kim, Seoul (KR); Siyoung Park, Seoul (KR); Junyoung Park, Seoul (KR); Sewon Jang, Seoul (KR); Shin Han, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/891,541

(22) Filed: Feb. 8, 2018

(65) Prior Publication Data
US 2019/0045294 A1    Feb. 7, 2019

Related U.S. Application Data

(60) Provisional application No. 62/541,075, filed on Aug. 3, 2017.

(30) Foreign Application Priority Data

Aug. 18, 2017  (KR) .................. 10-2017-0104744
Nov. 20, 2017  (KR) .................. 10-2017-0154846

(51) Int. Cl.
*H04R 1/10* (2006.01)

(52) U.S. Cl.
CPC ......... *H04R 1/1066* (2013.01); *H04R 1/1075* (2013.01); *H04R 2420/07* (2013.01)

(58) Field of Classification Search
CPC . H04R 1/1066; H04R 1/1075; H04R 2420/07
See application file for complete search history.

(56) References Cited

U.S. PATENT DOCUMENTS

| 9,016,607 | B2 | 4/2015 | Wong et al. | |
|---|---|---|---|---|
| 9,055,364 | B1 * | 6/2015 | Uh | H04R 5/033 |
| 9,918,155 | B2 * | 3/2018 | Kim | H04B 1/034 |
| 2011/0139918 | A1 | 6/2011 | Chen | |
| 2014/0198927 | A1 | 7/2014 | Cheng | |

FOREIGN PATENT DOCUMENTS

| EP | 2645509 A1 | 10/2013 | | |
|---|---|---|---|---|
| EP | 3107313 A1 | 12/2016 | | |
| EP | 3188499 A1 * | 7/2017 | ............ | H04B 1/034 |

(Continued)

*Primary Examiner* — Mohammad K Islam
(74) *Attorney, Agent, or Firm* — Birch, Stewart, Kolasch & Birch, LLP (57) ABSTRACT

A portable sound device having a main body having an earbud holder, an earbud detachably mounted in the earbud holder for outputting a sound, a main board located in the main body, the main body being connected to the earbud via a sound cable, and a rotary module mounted in the main body is provided. The rotary module includes a shaft fixed to the main body, a bobbin rotatable about the shaft, the sound cable being wound around the outer circumferential surface of the bobbin, a reel spring providing rotary force to the bobbin, a track having a concave part, the track being rotated with the bobbin, a guide plate having a guide slot, through which the shaft extends, the guide slot extending in one direction, and a bump protruding from the guide plate so as to be inserted into the track.

19 Claims, 10 Drawing Sheets

(56) References Cited

FOREIGN PATENT DOCUMENTS

| | | |
|---|---|---|
| KR | 20-0336095 Y1 | 12/2003 |
| KR | 10-1471904 B1 | 12/2014 |
| KR | 10-2016-0048452 A2 | 5/2016 |
| KR | 10-2016-0147687 A | 12/2016 |
| KR | 10-1687623 B1 | 12/2016 |
| KR | 10-1710140 B1 | 2/2017 |
| KR | 10-1716870 B1 | 3/2017 |
| KR | 10-1752771 B1 | 6/2017 |
| KR | 10-2017-0087035 A | 7/2017 |
| KR | 10-1758285 B1 | 7/2017 |

* cited by examiner

PORTABLE SOUND DEVICE

This application claims priority to U.S. Provisional Application No. 62/541,075 filed on Aug. 3, 2017, Korean Application No. 10-2017-0104744 filed on Aug. 18, 2017 and Korean Application No. 10-2017-0154846 filed on Nov. 20, 2017, the entire contents of each of which is hereby incorporated by reference in its entirety.

BACKGROUND OF THE INVENTION

Field of the Invention

The present invention relates to a portable sound device that receives a sound signal from a terminal through wireless communication with the terminal and transmits a control signal for controlling the terminal to the terminal.

Discussion of the Related Art

A portable sound device is a device that receives a sound signal from a terminal and transmits information about a sound collected through a microphone to the terminal. Conventional portable sound devices use a wired mode, in which a portable sound device is connected to a terminal through an ear jack in order to receive a sound signal from the terminal. In recent years, however, the demand for a wireless communication type portable sound device has been increased due to the convenience in mobility and use thereof.

A portable sound device has an audio output module, through which music can be played and a telephone conversation can be performed. The portable sound device may be connected to a base station in order to have a telephone conversation, may be directly connected to an external server in order to acquire sound data, and may be connected to a terminal in order to perform the above functions through pairing.

Various types of portable sound devices based on the portability thereof, such as a headphone-type portable sound device, which is placed on the head of a user in the form of a hair band such that the user can carry the portable sound device, an ear-hanging type portable sound device, and an in-ear type portable sound device, have been developed.

A sound cable, which connects an earbud, which is inserted into the ear of a user to output a sound, to a body, which functions as a holder, is long. When not in use, therefore, the cable may be tangled or caught on something, which is inconvenient. For this reason, a rotary module for receiving the sound cable in the body may be provided.

SUMMARY OF THE INVENTION

Accordingly, the present invention is directed to a portable sound device that substantially obviates one or more problems due to limitations and disadvantages of the related art.

An object of the present invention is to provide a portable sound device that receives a sound signal from a terminal through wireless communication with the terminal and transmits a control signal for controlling the terminal to the terminal, wherein the number of members constituting a rotary module is reduced, whereby the portable sound device has a compact structure.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a portable sound device includes a main body having an earbud holder, an earbud detachably mounted in the earbud holder for outputting a sound, a main board located in the main body, the main body being connected to the earbud via a sound cable, and a rotary module mounted in the main body, the rotary module being rotated to wind or unwind the sound cable, wherein the rotary module includes a shaft fixed to the main body, a bobbin rotatable about the shaft as the axis thereof, the sound cable being wound around the outer circumferential surface of the bobbin, a reel spring for providing rotary force to the bobbin, a track having a concave part, the track being rotated with the bobbin when the bobbin is rotated, a guide plate having a guide slot, through which the shaft extends, the guide slot extending in one direction, and a bump protruding from the guide plate so as to be inserted into the track, the position of the bump on the track being changed when the bobbin is rotated.

The rotary module may further include a bracket fixed to the main body for covering the guide plate, the bracket defining the external appearance of the rotary module, the bracket may include a stopper slot extending in a direction parallel to the direction in which the guide slot extends, and the guide plate may further include a stopper boss configured to be inserted into the stopper slot.

The bump may protrude from one surface of the guide plate, and the stopper boss may protrude from the other surface of the guide plate.

The stopper boss may be formed in a pillar shape having a rectangular or oval section that is longer in the longitudinal direction of the stopper slot.

The portable sound device may further include an elastic unit interposed between the bracket and the guide plate for providing elasticity, by which the guide plate is pushed toward the track.

The track may include a first circular track having the shaft as the center thereof, a second circular track having the shaft as the center thereof, the second track having a different track than the first track, a connection track for interconnecting the first track and the second track, and a fixing track located between the first track and the second track, the fixing track being formed in a V shape that is bent once.

The first track and the second track may be inclined along the circumferences thereof in opposite directions and may include step parts for compensating for a difference in the depth thereof due to the inclination thereof.

The bump may move along the connection track or the fixing track when caught by the step parts.

The guide slot may have a length equal to or greater than the sum of the distance between the first track and the second track and the diameter of the shaft.

The end of the bump may have a hemispherical shape, and each of the first and second tracks may have a semicircular section.

The track may be coupled to the bobbin so as to be rotatable with the bobbin, and the guide plate may move linearly when the bobbin is rotated.

The guide plate may include a metal sheet, and the bump may be formed by pressing one side of the metal sheet so as to protrude in the opposite direction.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
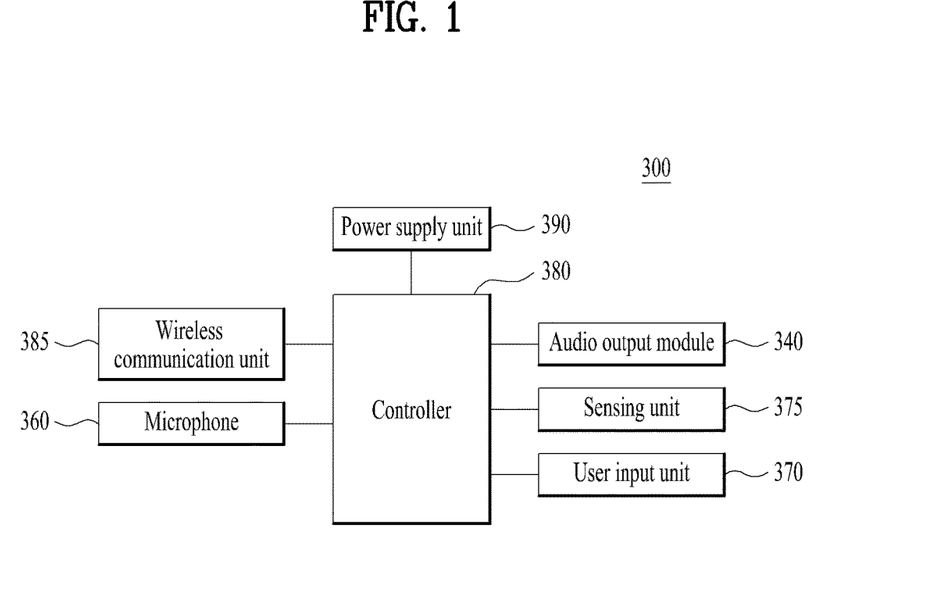
FIG. 1 is a block diagram showing the structure of a portable sound device according to an embodiment of the present invention.
Figure 2:
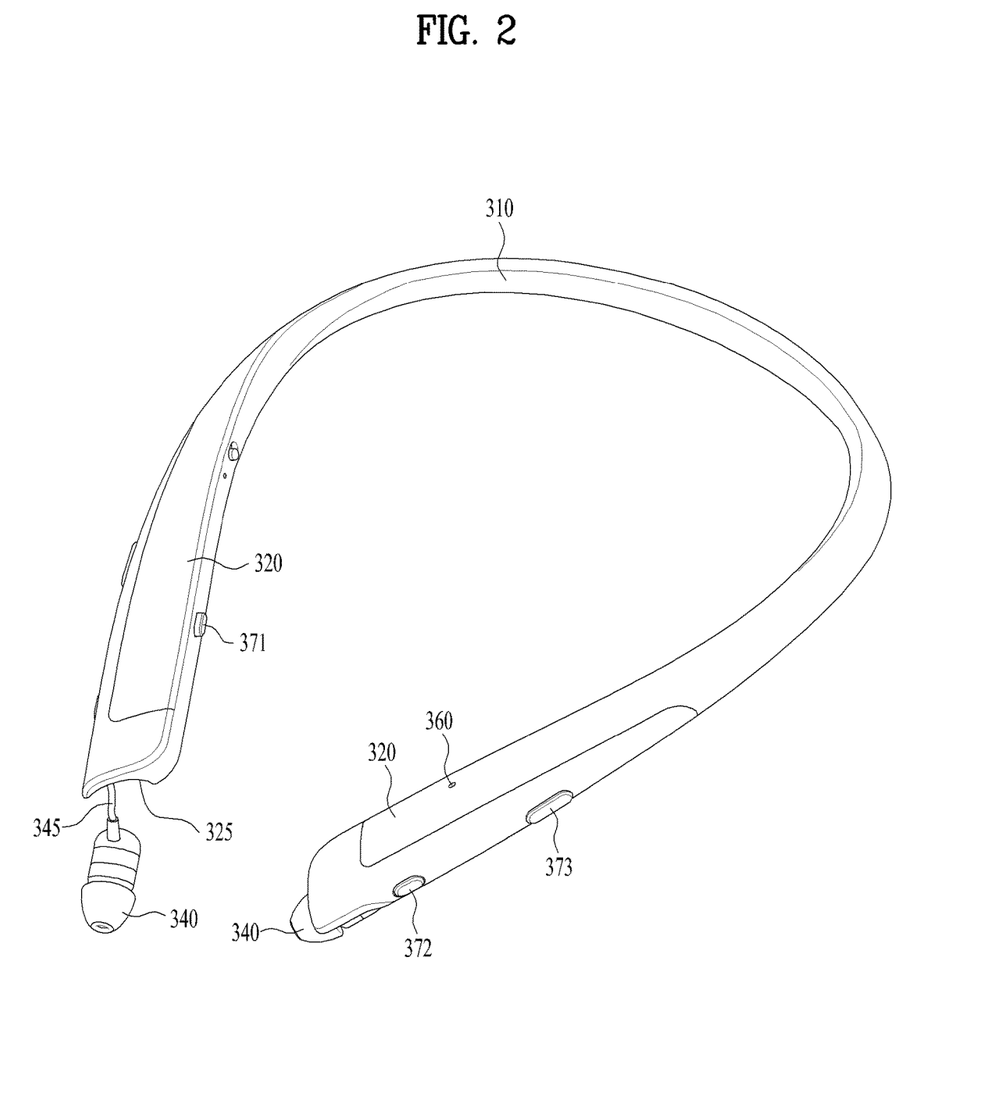
FIG. 2 is a perspective view of the portable sound device according to the embodiment of the present invention when viewed in one direction.

FIG. 1 is a block diagram of a portable sound device 300 according to an embodiment of the present invention. FIG. 2 is a perspective view of the portable sound device 300 according to the embodiment of the present invention when viewed in one direction. For convenience in describing the structure of the portable sound device 300 shown in FIG. 1, reference is also to be made to FIG. 2.

The portable sound device 300 according to the embodiment of the present invention includes a controller 380, a wireless communication unit 385, an audio output module 340, a sensing unit 375, a microphone 360, a user input unit 370, and a power supply unit 390.

The audio output module 340 outputs sound according to a sound signal. A representative example of the audio output module 340 is an earbud, which is inserted into an ear of a user in order to transmit sound to the ear.

The microphone 360 processes an external sound signal into electrical voice data. The processed voice data is transmitted to an external terminal or an external server via the wireless communication unit 385. The microphone 360 may use various noise removal algorithms for removing noise generate when receiving an external sound signal.

The sensing unit 375 recognizes the state of the portable sound device 300 and the surroundings of the portable sound device 300. The sensing unit 375 may include an illuminance sensor for sensing brightness around the portable sound device 300, a touch sensor for sensing a touch input, a gyro sensor for sensing the tilt and position of the portable sound device 300, and an earbud switch for sensing whether the earbud 340 is located in an earbud holder 325.

The user input unit 370 allows a user to control the portable sound device 300. An example of the user input unit 370 may include a talk button 372, a volume button 373, a power button 371, and a reception button for receiving a sound cable 345 in a housing 320.

The user input unit 370 may include only a talk button 372 and a pair of volume buttons 373. In addition, the user input unit 370 may include a play/stop button and a sequence change button. The size of the portable sound device 300 is limited, and the user may push the user input unit 370 without looking thereat. If the number of buttons is large, therefore, it is difficult for the user to distinguish between the buttons. For this reason, a limited number of buttons is used. In this case, the amount of time for which the buttons are pushed and the number of times that the buttons are pushed may be varied, and a plurality of buttons may be combined to input various control commands.

Since the user carries the portable sound device 300, the possibility of losing the portable sound device 300 is low. However, generally, terminals may be lost. For this reason, the user input unit 370 may perform an alarm function. For example, two buttons of the user input unit 370 may be simultaneously pushed for a predetermined amount of time. In this case, a lost terminal connected to the portable sound device through BLUETOOTH™ may sound an alarm, whereby the lost terminal may be easily found.

In addition, a voice recording function of an external terminal connected to the portable sound device through BLUETOOTH™ may be activated to store voices collected through the microphone 360 of the portable sound device 300.

Only functions related to conversation and functions related to playback of sound media are controllable using a conventional portable sound device. However, the portable sound device according to the present invention is characterized in that the portable sound device has diversified functions.

FIG. 2 is a perspective view of the portable sound device 300 according to the embodiment of the present invention when viewed in one direction. A main body of the portable sound device 300 according to the present invention includes an elastic band 310 and a housing 320. As shown in FIG. 2, the main body is curved in the shape of a C.

The housing 320, in which electronic parts are received, is provided at each end of the elastic band 310, which is placed on the neck of the user. The elastic band 310 and the housing 320 are partitioned based on the functions of the portable sound device. Consequently, the elastic band 310 and the housing 320 may be integrally formed, or may overlap each other.

The elastic band 310 has elasticity so as to be deformed within a predetermined range when force is applied thereto and to return to the original state thereof when the force is removed. If the distance between the opposite housings 320 is not sufficient for the neck of the user to pass between the housings 320, the housings 320 may be spaced apart from each other due to the elasticity of the elastic band 310 such that the elastic band 310 is placed on the neck of the user or removed from the neck of the user.

The shape and length of the elastic band 310 are set so as to minimize a foreign-body sensation when the elastic band 310 is placed on the neck of the user. For example, the elastic band 310 may be formed in the shape of a curved cylinder or a twisted tape having surfaces and a thickness. If the elastic band 310 is formed in the shape of a twisted tape, the inner surface of the elastic band 310 is placed on the rear of the neck of the user, and the outer surface of the elastic band 310 faces the rear of the neck of the user. The connection between the elastic band 310 and each housing 320 may be twisted such that the outer surface of each housing faces the front or the top of the user and the inner surface of each housing faces the rear or the collarbone of the user.

Housings 320 are coupled to the opposite ends of the elastic band 310 so as to be located at opposite ends of the C-shaped portable sound device 300. Inside and outside the housings 320 are disposed various components, such as a main board 381, the wireless communication unit 385, a battery 391, and a rotary module 350.

Figure 3:
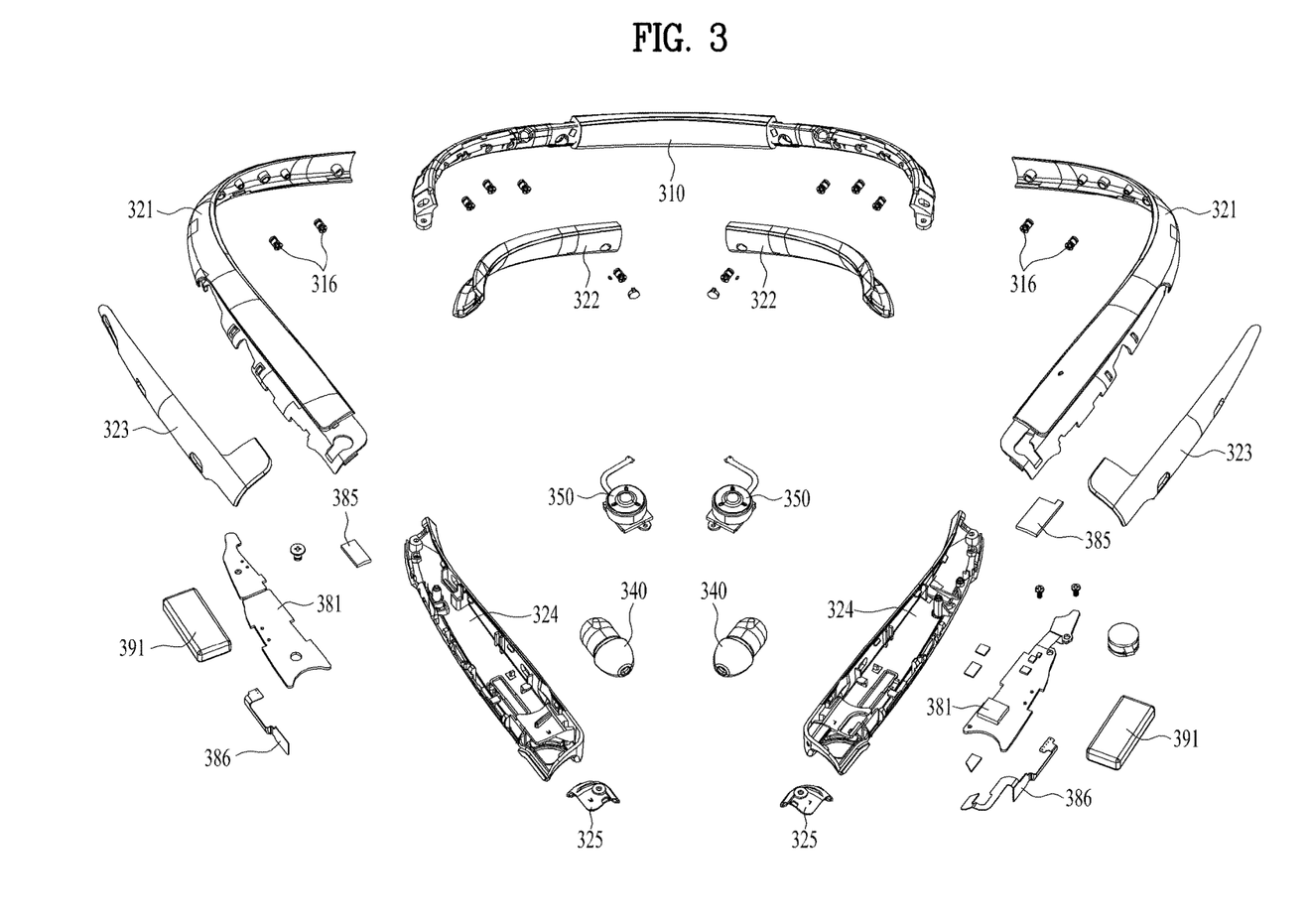
FIG. 3 is an exploded perspective view of the portable sound device according to the embodiment of the present invention.

As shown in FIG. 3, the C-shaped portable sound device 300 may be carried while being placed on the neck of the user. At this time, the sensing unit 375 may sense whether the user is wearing the portable sound device 300. For example, the sensing unit 375 may be a displacement sensor located at the elastic band 310 for sensing a change in the curvature of the elastic band 310. The displacement sensor may sense whether the housings 320 are spaced apart from each other when the user puts on the portable sound device 300. In this case, the curvature of the elastic band 310 is gently changed. Consequently, it may be determined that the user will use the portable sound device 300, and the portable sound device 300 may be powered on, or the portable sound device 300 may be synchronized with an external terminal.

In order to more accurately determine whether the user wears the portable sound device or the housings have been spaced apart from each other while the user is carrying the portable sound device, additional curvature of the elastic band 310 after the curvature of the elastic band 310 has been greatly changed may also be considered. When the curvature of the elastic band 310 is greatly changed to a first size and then is fixed to a second size, which is less curved than the state in which the portable sound device 300 remains unused, it may be determined that the portable sound device 300 has been placed on the neck of the user.

In addition to the displacement sensor, a temperature sensor, an optical sensor, or a heartbeat sensor may be provided at the surface of the portable sound device that comes into contact with the neck of the user when the user puts on the portable sound device. When the body temperature is sensed, when brightness around the portable sound device is reduced, or when a heartbeat is sensed, it may be determined that the user is wearing the portable sound device, and the portable sound device 300 may be powered on, or the wireless communication unit 385 may be activated for synchronization with an external terminal.

Alternatively, a switch configured to be physically pushed may be used. When the user wears the portable sound device, the switch may be pushed to generate an ON signal. When the switch remains on for a predetermined amount of time or more, the portable sound device 300 may be powered on, or may be synchronized with an external terminal.

The sensing unit 375 may include a plurality of switches. In this case, a plurality of values may be combined to correctly determine whether the user is wearing the portable sound device.

FIG. 3 is an exploded perspective view of the portable sound device 300 according to the embodiment of the present invention Each of the housings 320, coupled to opposite ends of the elastic band 310, includes an upper case 321 and a lower case 324. Between the upper case 321 and the lower case 324 are mounted the main board 381, the wireless communication unit 385, the battery 391, the microphone 360, and the rotary module 350.

The housings 320 are manufactured by injection-molding a polymer material. For example, the housings 320 may be made of plastic, such as polystyrene (PS). The housings 320 may partially include a different material, such as metal, glass, or leather, in a portion thereof.

The housings 320 are made of polystyrene, which exhibits high rigidity, in order to protect the components therein. In addition, the surfaces of the housings 320 may be coated with polyurethane such that the housings can come into tight contact with the body of the user. When the surfaces of the housings 320 are coated with polyurethane, the portable sound device 300 may have an external appearance that provides a sense of unity. Since the elastic band 310 and the housings 320 come into tight contact with the skin of the user, the portable sound device does not shake when the user moves, whereby the wearing sensation is improved.

The portable sound device 300, which is placed on the body of the user, is easily exposed to moisture, such as sweat. For this reason, the portable sound device has a waterproofing function in order to improve the durability thereof. A rib or a waterproofing member may be interposed in the gap between the upper case 321 and the lower case 324 in order to prevent water from permeating therethrough. Even though a separate waterproofing member is not provided, the upper case 321 and the lower case 324 may come into tight contact with each other through polyurethane coating.

The wireless communication unit 385 and the microphone 360 are mounted on the main board 381, which is mounted in one of the housings 320, and are connected to the battery 391, the user input unit 370, and the audio output module 340. The components mounted in the housings 210 may be disposed symmetrically or asymmetrically. Only the components mounted in one of the housings 320 may be used through a signal cable mounted in the elastic band 310. For example, in the case in which the wireless communication unit 385 is mounted in one of the housings 320, a sound signal received by the wireless communication unit 385 may be transmitted to the earbuds 340 via the signal cable.

The wireless communication unit 385 may include an antenna pattern 386 mounted on the main board 381 or formed on the surfaces of the housings 320 for transmitting and receiving a signal to and from an external terminal. The wireless communication unit 385 is synchronized with an external terminal using a short-distance wireless communication system, such as BLUETOOTH™, in order to receive a control signal and a sound signal from the external terminal, or transmits a control signal and a sound signal input through the user input unit 370 or the microphone 360 of the portable sound device 300 to the external terminal.

The power button 371, which is used to turn power on/off, the talk button 372, which is used for play or conversation, and the direction key 373, which is used to control sound, may be included in the housings 320. (The direction key may also be used to perform control to play the previous track or the next track.) A dome key that is physically pushed or a touch key that senses a change of capacitance may be used as each button.

The position of the touch key is not limited, and the surfaces of the housings 320 may be variously used. When the touch key is formed on the surfaces of the housings 320, the position and function of the touch key may be displayed on the portions of the surfaces of the housings 320 at which the touch key is formed using LEDs.

The earbuds 340 are inserted into the ears of the user to transmit sound to the user. The earbuds 340 are connected to the main board 381 via the sound cable 345. A sound output module (not shown) may perform a function of directly generating sound in the earbuds 340. The sound output module may include a vibrating plate.

The main board 381 controls the earbuds 340 so as to output sound according to a sound signal.

Figure 4:
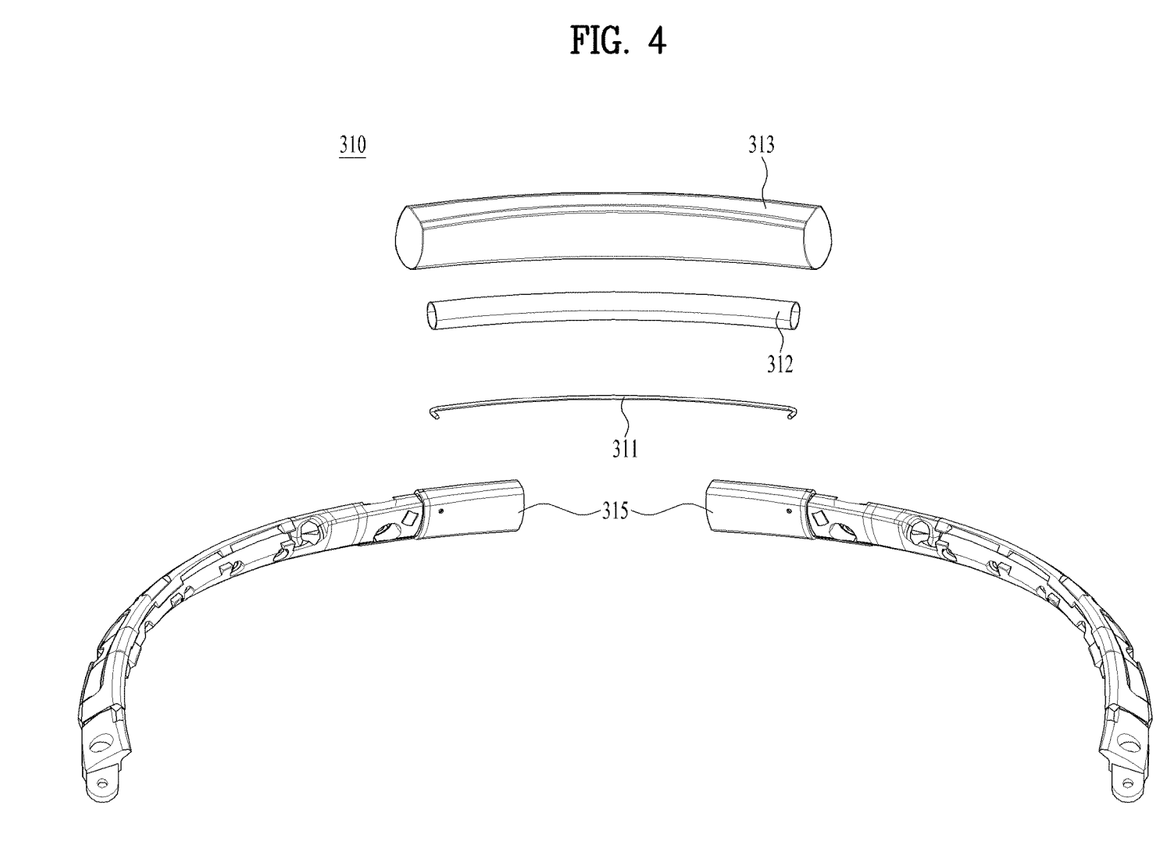
FIG. 4 is an exploded perspective view of an elastic band of the portable sound device according to the embodiment of the present invention.

FIG. 4 is an exploded perspective view of an elastic band 310 of a portable sound device 300 according to another embodiment of the present invention. The elastic band 310 includes a shape memory alloy 311, covering units 312 and 313, and connection units 315.

The shape memory alloy 311 returns to a specific shape when deformed. When the elastic band 310 is deformed as the main body is widened by the user, the shape memory alloy 311 returns to the original shape thereof. Consequently, deformation of or damage to the portable sound device 300 is prevented.

The covering units 312 and 313 cover the shape memory alloy 311. The covering units 312 and 313 may be made of thermoplastic polyurethane, the shape of which is variable. Thermoplastic polyurethane is melted by heat, and has the same elasticity as rubber, and is resistant to oil and wear after hardening.

The connection units 315 have fastening structures configured to be coupled to the housings 320, which are located at opposite ends of the elastic band 310. The connection units 315 extend leftward and rightward from the covering units 312 and 313 so as to overlap the housings 320, and are coupled to the covering units 312 and 313 so as to be covered by the covering units 312 and 313. That is, the covering units 312 and 313 are formed on the shape memory alloy 311 and the connection units 315 by double injection.

The second covering unit 312 covers the shape memory alloy 311 and the signal cable so as to accurately dispose the shape memory alloy 311 at the connection units 315 and to fix the signal cable, which transmits and receives a signal to or from the housings 320. The opposite ends of the second covering unit 312 are coupled to the respective connection units 315. Subsequently, the first covering unit 313, which covers the connection units 315, the second covering unit 312, and the shape memory alloy 311, is formed by double injection. As a result, the elastic band 310 is configured to be easily deformed when the user wears the portable sound device and to return to the original shape thereof.

Figure 5:
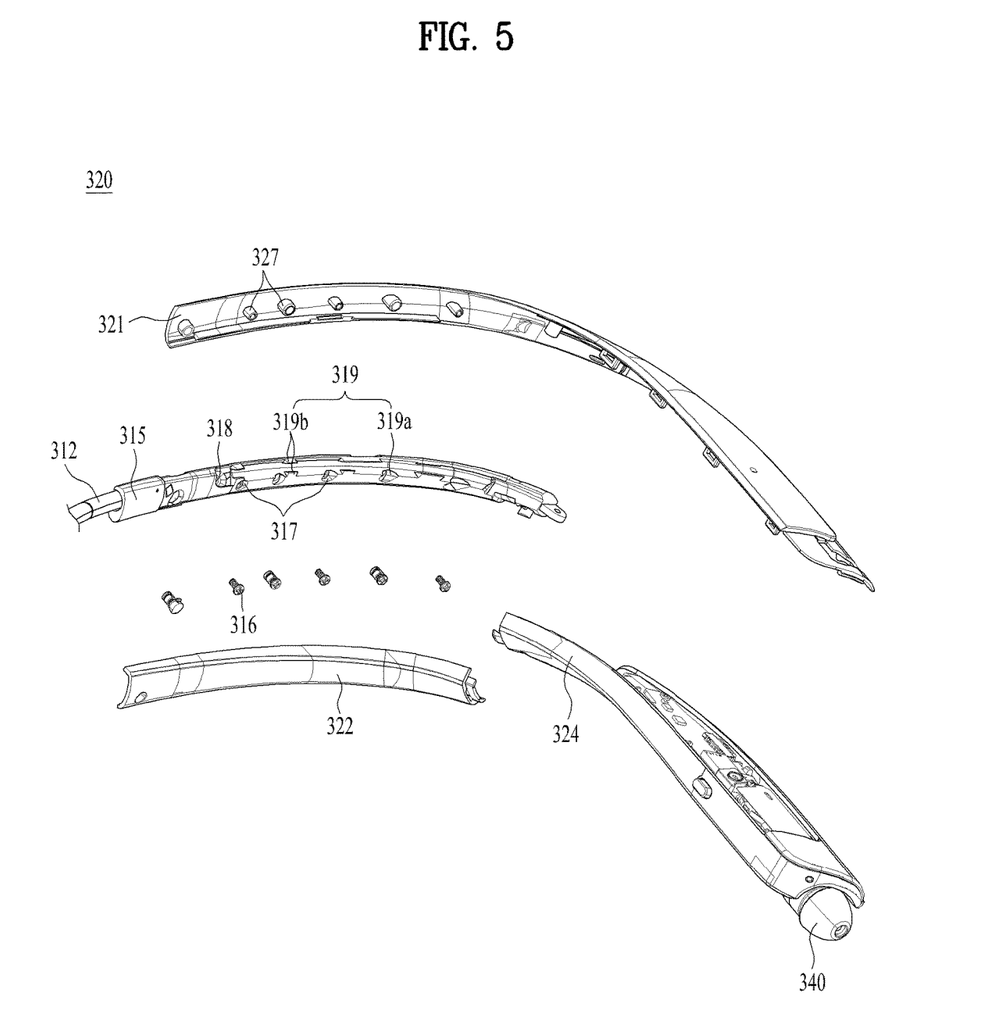
FIG. 5 is a view showing coupling between a housing and the elastic band of the portable sound device according to the embodiment of the present invention.

FIG. 5 is a view showing coupling between the elastic band 310 and the housing 310 of the portable sound device 300 according to the embodiment of the present invention. The shape memory alloy 311 (see FIG. 4) is exposed from the opposite ends of the second covering unit 312. In order to increase fixing force, the opposite ends of the shape memory alloy 311 (see FIG. 4) may be bent in the form of a hook so as to be connected to the connection units 315. Each connection unit 315 is provided with a plurality of holes, through which each connection unit 315 is fastened to a corresponding one of the housings 320.

At least a portion of each connection unit 315 may be surrounded by a corresponding one of the housings 320. An upper case 321 and lower cases 322 and 324 may cover one surface and the other surface of at least a portion of each connection unit 315, respectively. The upper case 321 is exposed outward. For this reason, the upper case 321 is formed of a single member that extends from the portions of the elastic band 310 that are coupled to the connection units 315 to the opposite ends of the main body. As shown in FIG. 5, the lower cases 322 and 324 may include a first lower case 322, which surrounds a corresponding one of the connection units 315, and a second lower case 324, in which components are mounted.

The upper case 321 or one of the lower cases 322 and 324 and a corresponding one of the connection units 315 are coupled to each other by screws 316, which are fastened to the upper case 321 or one of the lower cases 322 and 324 through fastening holes formed in the connection unit 315. The portion of the case from which the heads of the screws 316 are exposed may be covered by coupling between the case and the opposite case.

The length of each connection unit 315 may be set as needed. In order to secure space and to reduce the weight of the portable sound device, each connection unit 315 may be formed so as to be short such that the minimum number of screws 316 is used. In this case, however, the fastening force between the elastic band 310 and the housings 320 is low. When force is repeatedly applied to the elastic band 310, therefore, the elastic band may be damaged. Consequently, each connection unit 315 may be extended far enough to increase fastening force using the maximum number of screws 316.

Figure 6:
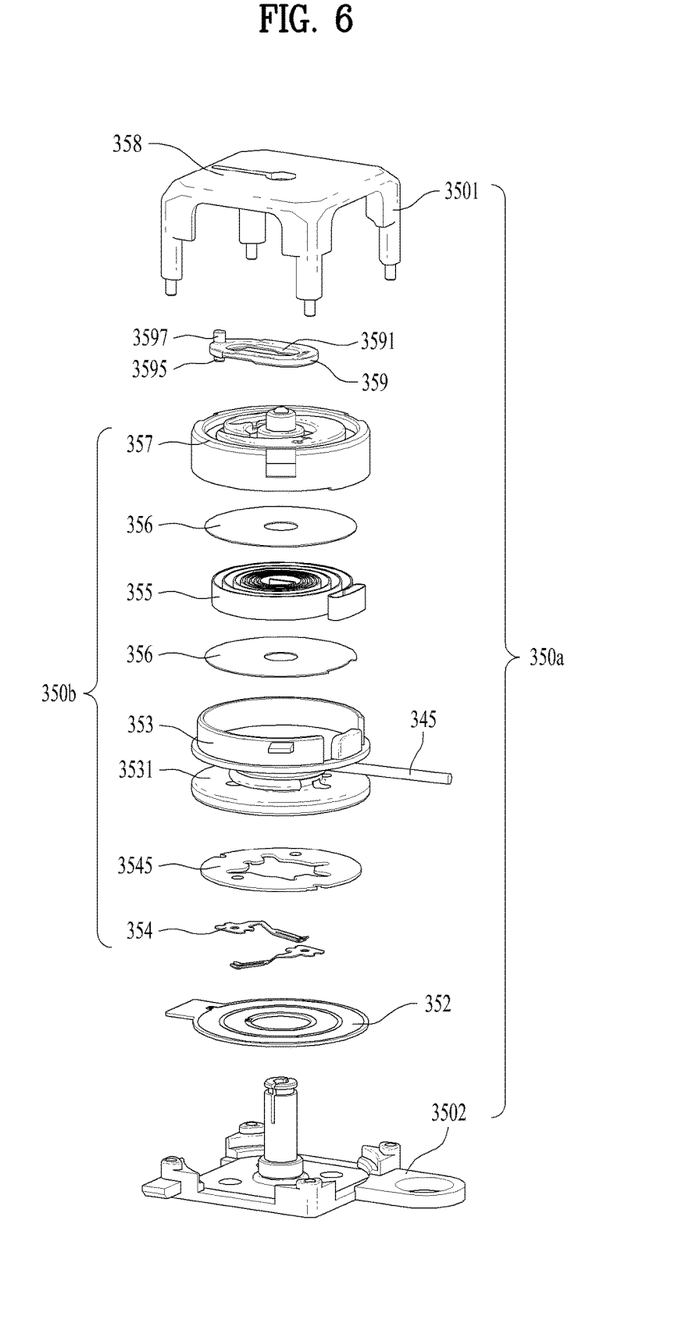
FIG. 6 is an exploded perspective view of a rotary module of the portable sound device according to the embodiment of the present invention.

FIG. 6 is an exploded perspective view of the rotary module 350 of the portable sound device according to the embodiment of the present invention.

The rotary module 350 is rotatably mounted in each housing 320. When the rotary module 350 is rotated, the sound cable 345 is wound around the rotary module 350 such that the sound cable 345 is received in each housing 320 (see FIG. 3). The earbuds 340 (see FIG. 3) are fastened to the respective earbud holders (see FIG. 2). The rotary module 350 includes a stationary unit 350a, which is fixed to the housing 320, and a rotary unit 350b configured to be rotatable relative to the stationary unit 350a. The stationary unit 350a may further include brackets 3501 and 3502, which define the external appearance of the rotary module 350.

The stationary unit 350a includes a shaft 351, which serves as the axis of rotation of the rotary module 350, and the rotary unit 350b includes a cylindrical bobbin 353, around which the sound cable 345 is wound. The bobbin 353 may include a concave part 3531, which is recessed toward the center thereof to provide a space in which the sound cable 345 is wound.

A reel spring 355 is provided in the bobbin 353 to provide the force necessary to rotate the rotary module 350. The reel spring 355 is a kind of leaf spring that is spirally wound. The inside end of the reel spring 355 is fixed to the shaft 351, and the outside end of the reel spring 355 is coupled to the rotary unit 350b. When the user pulls the sound cable 345, the bobbin 353 is rotated in a first direction (the counterclockwise direction in the figure). As a result, the number of windings of the reel spring 355 is reduced, whereby the reel spring 355 has elastic restoring force. When the user releases the sound cable 345, the reel spring 355 is rotated in a second direction (the clockwise direction in the figure), which is opposite the first direction, due to the restoring force thereof. As a result, the sound cable 345 is wound around the bobbin 353, whereby the sound cable 345 is received in the housing 320.

Even when the rotary unit 350b is rotated, the sound cable 345 must be connected to the main board 381 mounted in the housing 320. To this end, the stationary unit 350a includes a rotary module board 352, which is connected to the main board 381. The rotary module board 352 includes two electrodes 3521 and 3522 having different diameters. Connection terminals 354, which are connected to the electrodes 3521 and 3522, are located in the rotary unit 350b. The connection terminals 354 are connected to the sound cable 345. Even when the rotary unit 250b is rotated, the connection terminals remain connected to the electrodes 3521 and 3522. An auxiliary board 3545 may be further included to prevent the connection terminals 354 from being separated from the electrodes 3521 and 3522 and to connect the connection terminals 354 to the sound cable 345 by soldering.

A rotary guide for controlling the rotation of the rotary unit 350b in the second direction due to the elasticity of the reel spring 355 may be further included. The rotary guide does not disturb the rotation of the rotary unit 350b in the first direction when the user pulls the sound cable 345. Consequently, the sound cable is drawn out while the rotary unit 350b is smoothly rotated as the user pulls the sound cable 345.

When the user releases the sound cable 345 after drawing out the sound cable 345, the rotary guide prevents the rotation of the rotary unit 350b in the second direction so as to fix the rotary unit 350b such that the sound cable 345 is not inserted into the housing 320 in the state of being drawn out.

When the sound cable 345 is pulled again and released, the fixed state of the rotary unit 350b is released, and the rotary unit 350b is rotated in the second direction due to the elasticity of the reel spring 355. As a result, the sound cable 345 is inserted into the housing.

The rotary guide includes a track 357 and a guide plate 359, which includes a guide slot 3591 and a bump 3595. The track 357, which is part of the rotary unit 350b, is rotated with the rotary unit 350b. The guide plate 359 moves linearly when the rotary unit 350b is rotated.

The guide plate 359 is a sheet-shaped member, which may be formed by injection or by machining a metal sheet. The guide slot 3591, the bump 3595, and a stopper boss 3597 are formed at the guide plate 359. The guide slot 3591 is an opening formed in the guide plate 359 so as to extend to one side thereof. The shaft 351 extends through the guide slot 3591. The guide slot 3591 serves to convert the rotary motion of the track 357 into a rectilinear motion. The guide plate 359 moves in the direction in which the guide slot 3591 extends.

The bump 3595 is a protrusion that protrudes from the guide plate toward the track 357. The bump 3595 may be formed in a shape corresponding to the section of the track 357. The section of the track 357 may have a semicircular curve, and the end of the bump 3595 may have a hemispherical shape corresponding to the curvature of the semicircle. In the case in which a metal sheet is used as the guide plate 359, the bump may be formed by pressing one side of the metal sheet so as to protrude in the opposite direction.

The stopper boss 3597 protrudes in the opposite direction to the bump 3595, and is inserted into a stopper slot 358 formed in the bracket 3501. As shown in FIG. 6, the stopper slot 358 extends in the direction parallel to the extension direction of the guide slot 3591. When the rotary unit 350b is rotated, the stopper slot 358 assists the guide plate 359 in moving linearly without rotating.

In the case in which the stopper boss 3597 and the stopper slot 358 are not provided, the guide plate 359 is not moved linearly but is rotated with the rotary unit 350b. In order to solve this problem, the rotation of the guide plate 359 may be prevented by the stopper slot 358, which is formed in the bracket 3501, which is included in the stationary unit, and may assist the guide plate 359 in moving linearly along the guide slot 3591.

The stopper boss 3595 may have a rectangular or oval section that is longer in the extension direction of the stopper slot 358 such that the stopper boss 3597 resists the rotation of the rotary unit 350b and such that the guide plate 359 stably moves linearly.

The track 357 includes a recessed part formed such that the bump 3593 can move along the track 357. The guide plate 359 moves depending on the position of the bump 3595 on the track, and the guide slot 3591 in the guide plate 359 is not rotated but moves linearly. The track 357 includes two circular tracks 3571 and 3572 having centers located on the shaft, a connection track 3573 interconnecting the circular tracks 3571 and 3572, and a fixing track 3574.

The track 357 is located on the bobbin 353, which is included in the rotary unit 350b, so as to be rotated along with the rotary unit 350b when the rotary unit 350b is rotated, and the guide plate 359 moves linearly depending on the position of the bump 3595 on the track 357 when the track is rotated.

Figure 7:
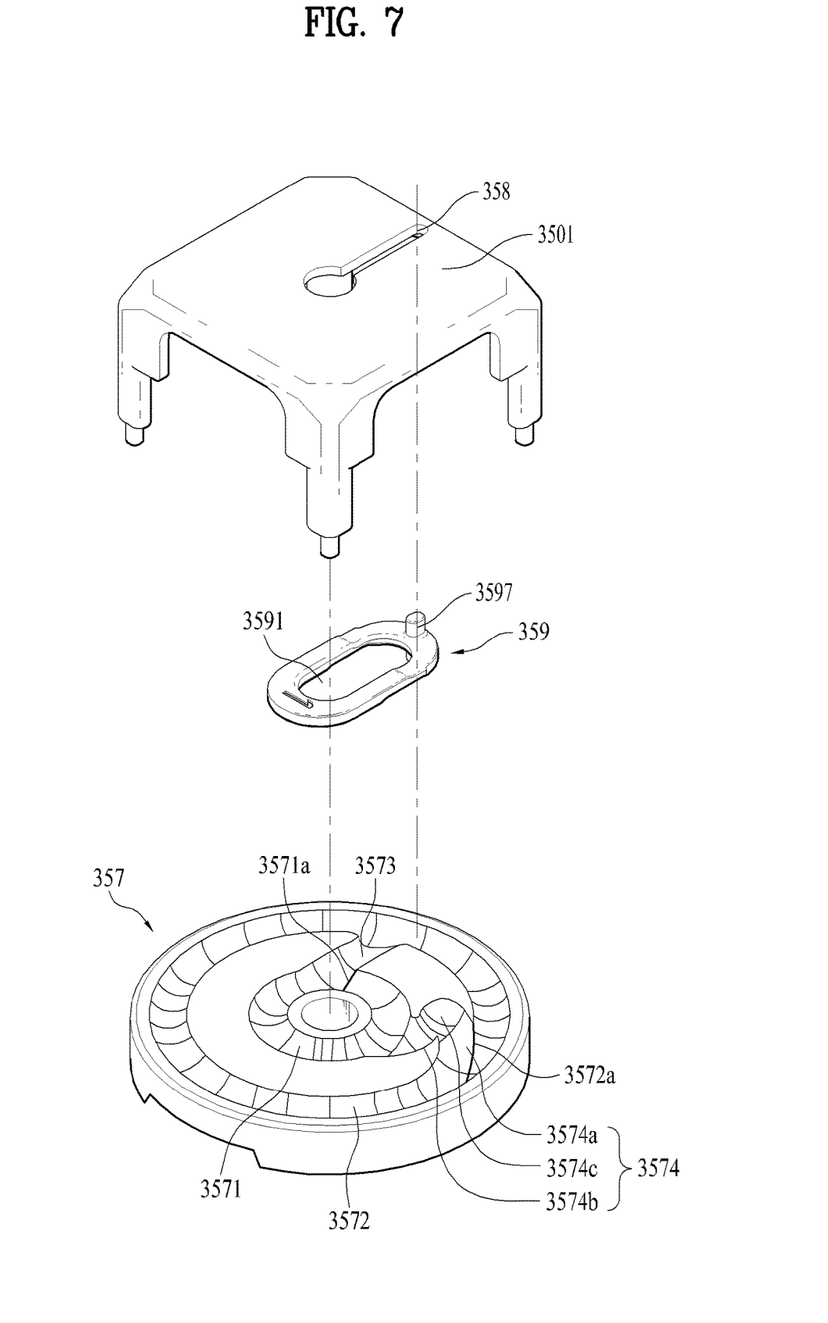
FIG. 7 is a block diagram showing a track of the portable sound device according to the embodiment of the present invention.
Figure 8:
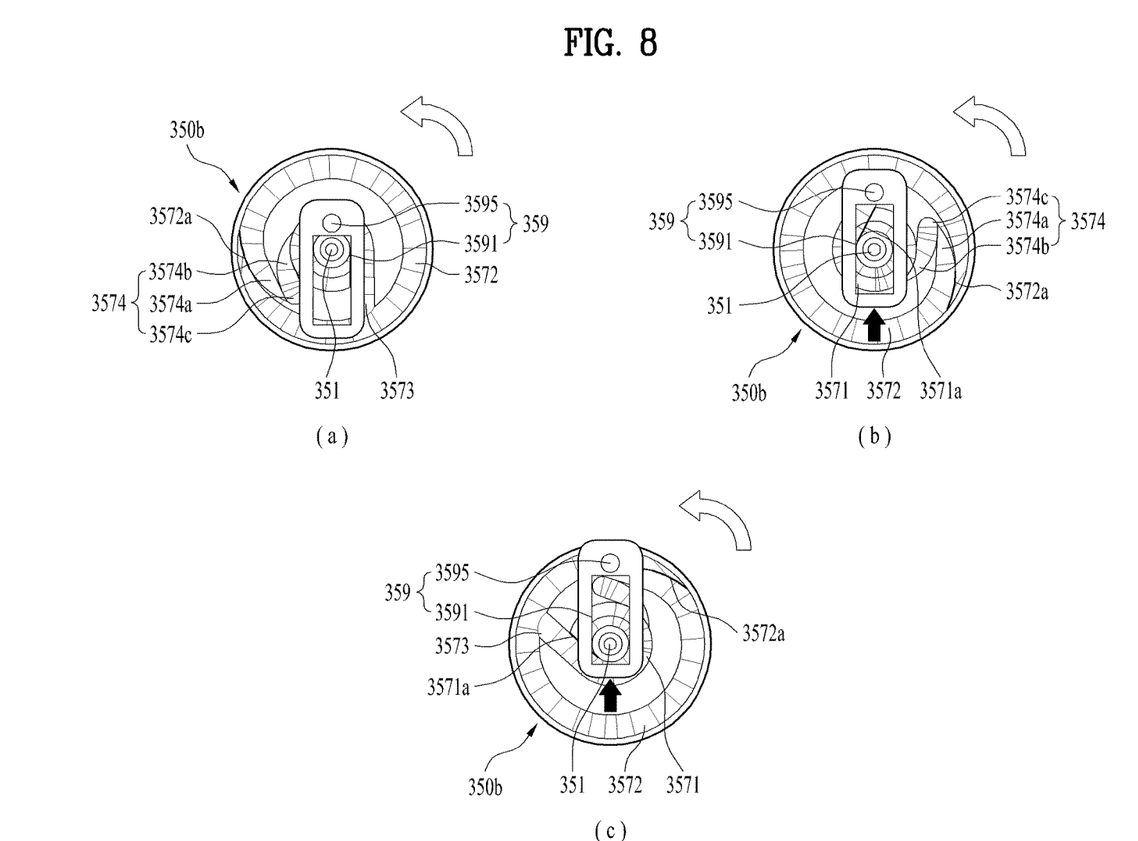
FIGS. 8 to 10 are views illustrating modes in which a bump of the portable sound device according to the embodiment of the present invention moves along the track.
Figure 9:
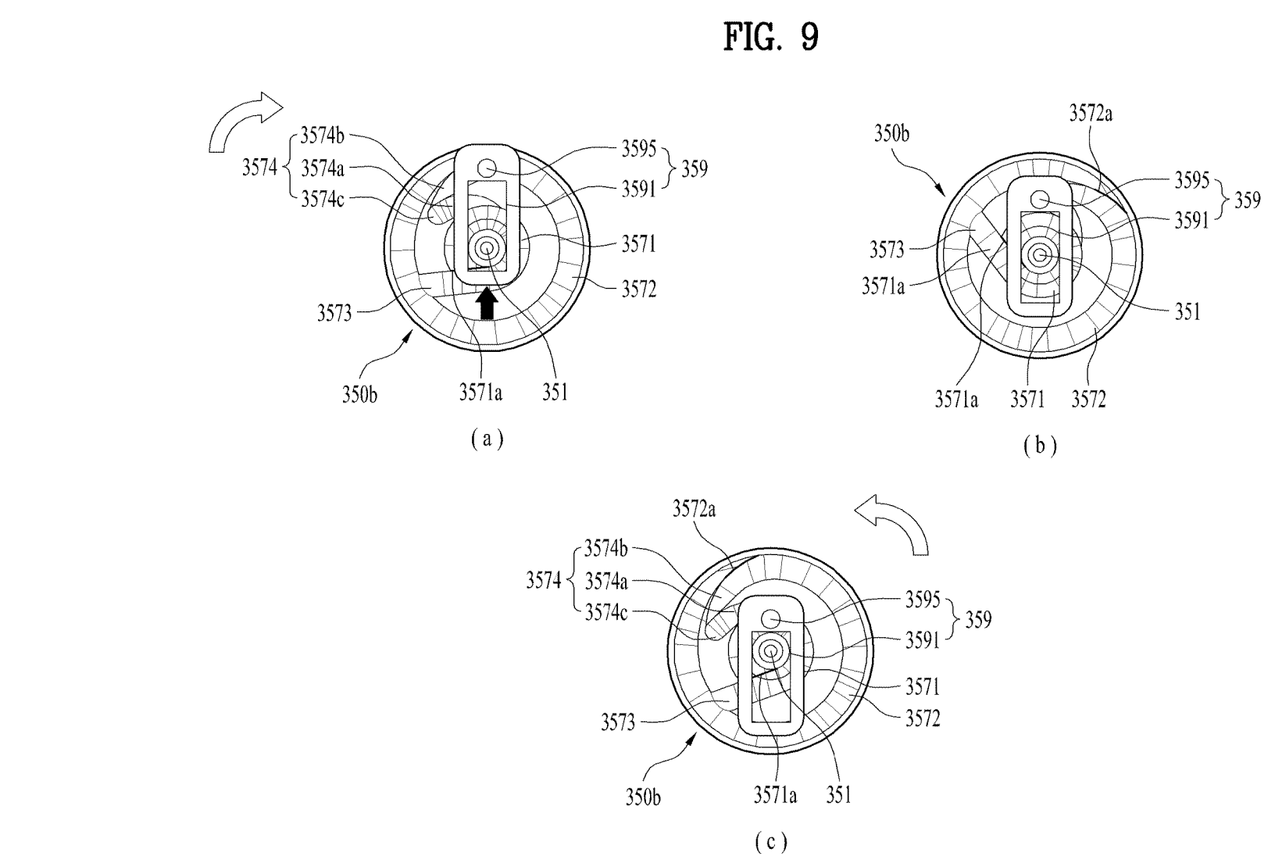
Figure 10:
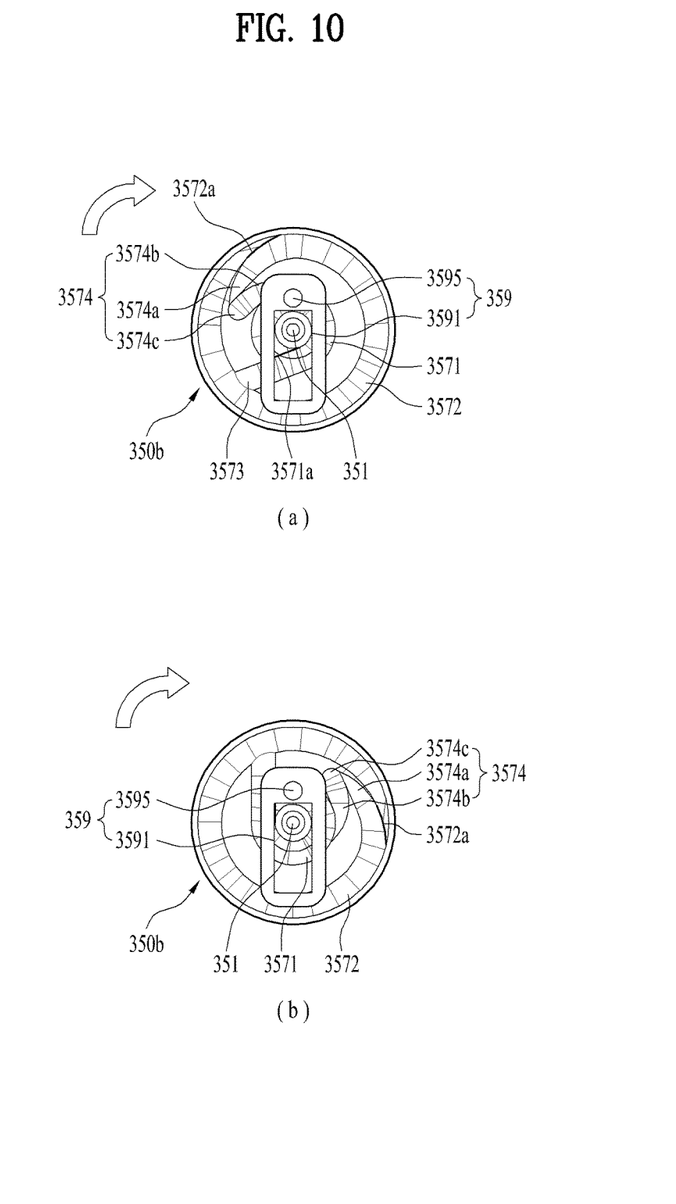

FIG. 7 is a block diagram showing the track 357 of the portable sound device according to the embodiment of the present invention, and FIGS. 8 to 10 are views illustrating modes in which the bump 3595 of the portable sound device according to the embodiment of the present invention moves along the track 357. Since the track 357 is rotated, the bump 3595 seems to move along the track 357 in the direction opposite the rotational direction of the rotary unit 350b.

Referring to FIG. 7, the track 357 includes a first circular track 3571, a second circular track 3572, and a connection track 3573 and a fixing track 3574 formed between the first track 3571 and the second track 3572. The first track 3571 and the second track 3572 have different diameters. Also, the first track 3571 and the second track 3572 have different depths. Step parts 3571a and 3572a are formed to compensate for the difference in depth between the first track 3571 and the second track 3572.

When the bump 3595 passes the step parts 3571a and 3572a from the high position to the low position of the first track 3571 and the second track 3572, the bump 3595 is continuously located on the first track 3571 and the second track 3572. On the other hand, when the bump 3595 passes the step parts 3571a and 3572a from the low position to the high position of the first track 3571 and the second track 3572, the bump 3595 is caught by the step parts 3571a and 3572a. As a result, the bump 3595 moves to the connection track 3573 or the fixing track 3574.

FIG. 8 is a view showing the positional relationship among the bump 3595, the track 357, and the guide slot 3591 when the user pulls the sound cable 345. When the user pulls the sound cable 345, the bobbin 353 is rotated in the first direction (the counterclockwise direction, which is the direction indicated by the arrow in the figure), and the bump 3595 on the first track 3571 is caught by the step part 3571a of the first track 3571 and moves to the second track 3571 along the connection track 3573 (FIGS. 8(a) and 8(b)).

The second track 3572 is inclined in the opposite direction to the first track 3571. When the user pulls the sound cable 345, therefore, the bump 3595 is not caught by the step part 3572a of the second track 3572, and the rotary unit 350b is rotated in the first direction in the state in which the bump 3595 is located on the second track 3572 (FIG. 8(c)).

When the bump 3595 moves from the first track 3571 to the second track 3572, the guide plate 359 moves linearly, and the position of the shaft 351 in the guide slot 3591 is changed. That is, the length of the guide slot 3591 must be greater than the distance between the first track 3571 and the second track 3572 in order to achieve movement from FIG. 8(a) to FIG. 8(c). More specifically, the minimum length of the guide slot 3591 must be equal to or greater than the sum of the distance between the middle of the first track 3571 and the middle of the second track 3572 and the length corresponding to the diameter of the shaft 351.

FIG. 9 is a view showing the positional relationship among the bump 3595, the track 357, and the guide slot 3591 in the state in which the rotation of the rotary module 350 is limited such that the sound cable 345 remains drawn out when the user releases the drawn sound cable 345. When the user releases the drawn sound cable 345, the track 357 is moved in the second direction due to the elasticity of the reel spring 355, and the bump 3595 is caught by the step part 3572a of the second track 3572 and moves to the fixing track 3574 (FIGS. 9(a) and 9(b)).

The fixing track 3574 includes a first part 3574a connected to the second track 3572 and a second part 3574b connected to the first track 3571. The first part 3574a and the second part 3574b extend from a corner part 3574c, to which the first part 3574a and the second part 3574b are connected, in opposite directions. The bump 3595 is fixed at the corner part 3574c, whereby the track 357 is prevented from being rotated in the second direction (FIG. 9(b)).

When the user pulls the sound cable 345 again, the rotary unit 350b is moved in the first direction. As a result, the bump 3595 moves to the first track 3571 along the second part 3574b (FIG. 9(c)). When the user continues to pull the sound cable 345, the bump 3595 is caught by the step part 3571a of the first track 3571 and moves to the second track 3572 via the connection track 3573, as shown in FIGS. 8(a) and 8(b), and the rotary unit 350b is rotated in the state in which the bump 3595 is located on the second track 3572.

FIG. 10 is a view showing the positional relationship between the bump 3595 and the track 357 when the user briefly pulls and releases the drawn and fixed sound cable 345. When the user releases the pulled sound cable 345, the rotary unit 350b is rotated in the second direction by the reel spring 355, and the bump 3595 remains located on the first track 3571. That is, the bump 3595 is located on the first track 3571 without disturbing the rotation of the rotary unit 350b until the sound cable is completely wound.

That is, when the sound cable 345 is drawn out, the rotary unit 350b is rotated in the first direction. Consequently, the bump 3595 moves along the second track 3572 in the second direction. When the sound cable 345 is inserted, the rotary unit 350b is rotated in the second direction. Consequently, the bump 3595 moves along the first track 3571 in the first direction. When the bump 3595 is located on the first track 3571, the shaft 351 is located at one side of the guide slot 3591. When the bump 3595 is located on the second track 3572, the shaft 351 is located at the other side of the guide slot 3591. When located on the fixing track 3574 or the connection track 3573, the shaft 351 is located at the middle of the guide slot 3591.

The bump 3595 must remain in contact with the track 357 so as to be caught by the step parts 3571a and 3572a on the track 357. To this end, an elastic unit 356 for providing force enabling the bump 3595 to come into tight contact with the track 357 may be further included. As shown in FIG. 6, a disk-shaped leaf spring may be used as the elastic unit. A member having elasticity, such as a pogo pin, may be used as the bump 3595, instead of the elastic unit 356.

As is apparent from the above description, in the portable sound device according to the present invention, the number of members constituting the rotary module is reduced, whereby the thickness of the rotary module is reduced and thus the limited space is efficiently used.

The above detailed description is not to be construed as limiting the present invention in any aspect, and is to be considered by way of example. The scope of the present invention should be determined by reasonable interpretation of the accompanying claims, and all equivalent modifications made without departing from the present invention should be included in the following claims.

What is claimed is:
1. A portable sound device comprising:
a main body having an earbud holder;
an earbud detachably mounted in the earbud holder, the earbud configured to output sound;
a main board located in the main body, the main body being connected to the earbud via a sound cable; and
a rotary module mounted in the main body, the rotary module being configured to be rotated to wind or unwind the sound cable, the rotary module including:
a shaft fixed to the main body;

a bobbin rotatable about the shaft, the sound cable being windable or unwindable around an outer circumferential surface of the bobbin;
a reel spring configured to provide a rotary force to the bobbin;
a track having a concave part, the track being rotated with the bobbin when the bobbin is rotated;
a guide plate having a guide slot through which the shaft extends, the guide slot extending in a first direction;
a bracket fixed to the main body to cover the guide plate, the bracket including a stopper slot extending in a direction parallel to the first direction in which the guide slot extends;
a bump protruding from the guide plate, the bump being inserted into the track, wherein the bump is moved along the track when the bobbin is rotated; and
a stopper boss protruding from the guide plate, the stopper boss being configured to be inserted into the stopper slot.

2. The portable sound device according to claim 1, wherein the bump protrudes from a first surface of the guide plate, and
wherein the stopper boss protrudes from a second surface of the guide plate opposite the first surface.

3. The portable sound device according to claim 1, wherein the stopper boss is formed in a pillar shape having a rectangular or oval section that is longer in a longitudinal direction of the stopper slot.

4. The portable sound device according to claim 1, further comprising an elastic unit interposed between the bracket and the guide plate to bias the guide plate toward the track.

5. The portable sound device according to claim 1, wherein the bracket defines an external appearance of the rotary module.

6. The portable sound device according to claim 1, wherein the track comprises:
a first circular track having a first diameter;
a second circular track having a second diameter, the second diameter being different from the first diameter;
a connection track connecting the first track and the second track; and
a fixing track connecting the first track and the second track.

7. The portable sound device according to claim 6, wherein the first track and the second track are concentric about the shaft.

8. The portable sound device according to claim 6, wherein the fixing track includes one bend so as to have a V-shape.

9. The portable sound device according to claim 8, wherein the first track and the second track are inclined in opposite directions along respective circumferences thereof.

10. The portable sound device according to claim 9, wherein each of the first track and second track includes a step part to compensate for a difference in depth thereof due to the respective inclinations of the first track and second track.

11. The portable sound device according to claim 10, wherein the bump is configured to move along the connection track when caught by the step of the first track and is configured to move alone the fixing track when caught by the step part of the second track.

12. The portable sound device according to claim 9, wherein the guide slot has a length in the first direction equal to or greater than a sum of a distance between the first track and the second track and a diameter of the shaft.

13. The portable sound device according to claim 9, wherein an end of the bump has a hemispherical shape, and
wherein each of the first and second tracks has a semicircular cross-section.

14. The portable sound device according to claim 1, wherein the track is coupled to the bobbin so as to be rotatable with the bobbin, and
wherein the guide plate moves linearly when the bobbin is rotated.

15. The portable sound device according to claim 1, wherein the guide plate includes a metal sheet, and the bump is formed by pressing one side of the metal sheet so as to protrude at an opposite side of the metal sheet.

16. The portable sound device according to claim 1, wherein the bump is a pogo-pin.

17. The portable sound device according to claim 1, further comprising an elastic band connected to one end of the main body.

18. The portable sound device according to claim 17, wherein the elastic band includes:
a memory shaped alloy; and
a cover encasing the memory shaped alloy therein.

19. The portable sound device according to claim 1, wherein the rotary module includes a rotary module board connected to the main board.

* * * * *